Figure 1:
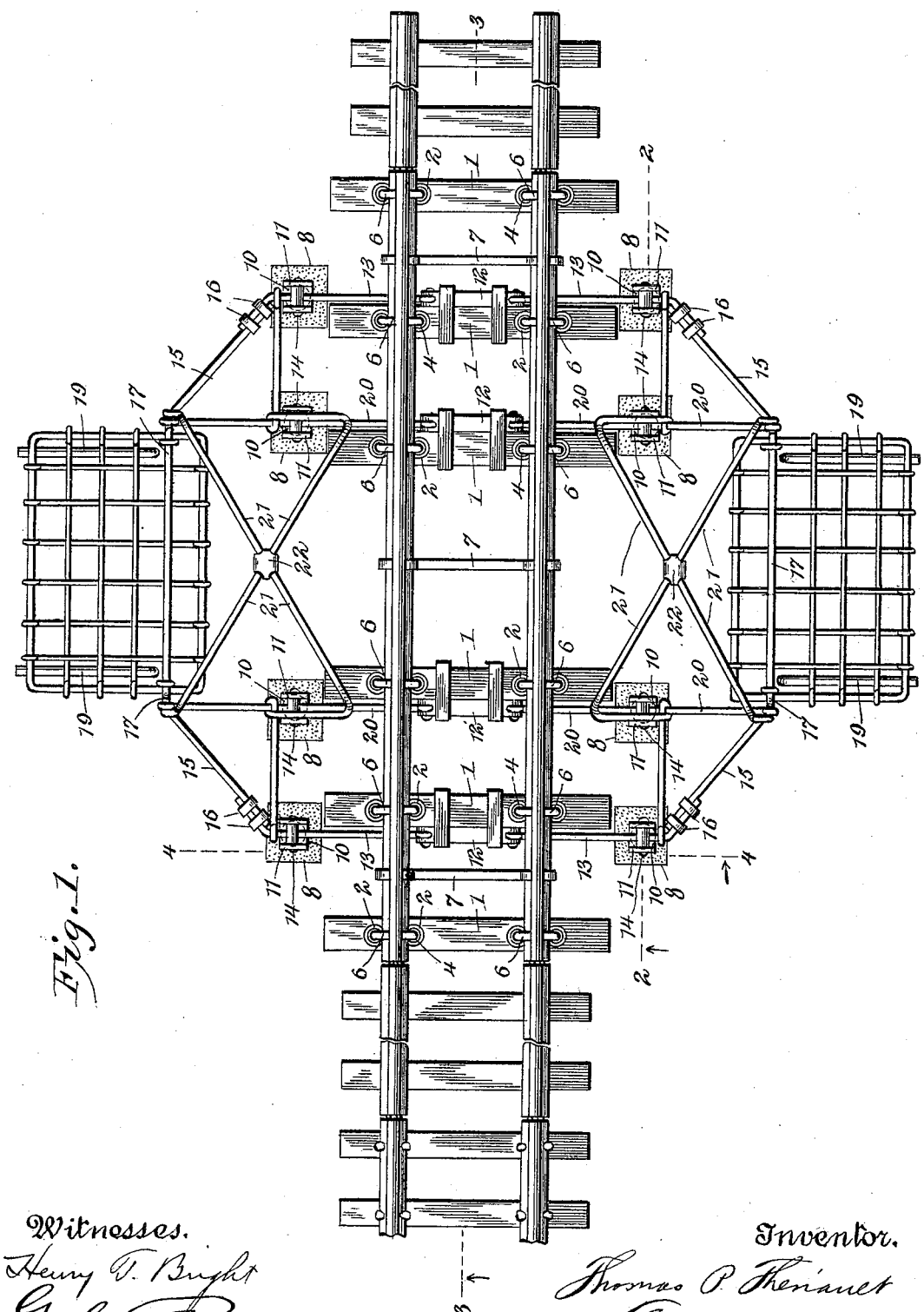

No. 649,184. Patented May 8, 1900.
T. P. THERIAULT.
AUTOMATIC GATE FOR STREETS CROSSING RAILWAYS.
(Application filed Aug. 28, 1899.)
(No Model.) 3 Sheets—Sheet 1.

Witnesses. Inventor.

No. 649,184. Patented May 8, 1900.
T. P. THERIAULT.
AUTOMATIC GATE FOR STREETS CROSSING RAILWAYS.
(Application filed Aug. 28, 1899.)
(No Model.) 3 Sheets—Sheet 2.
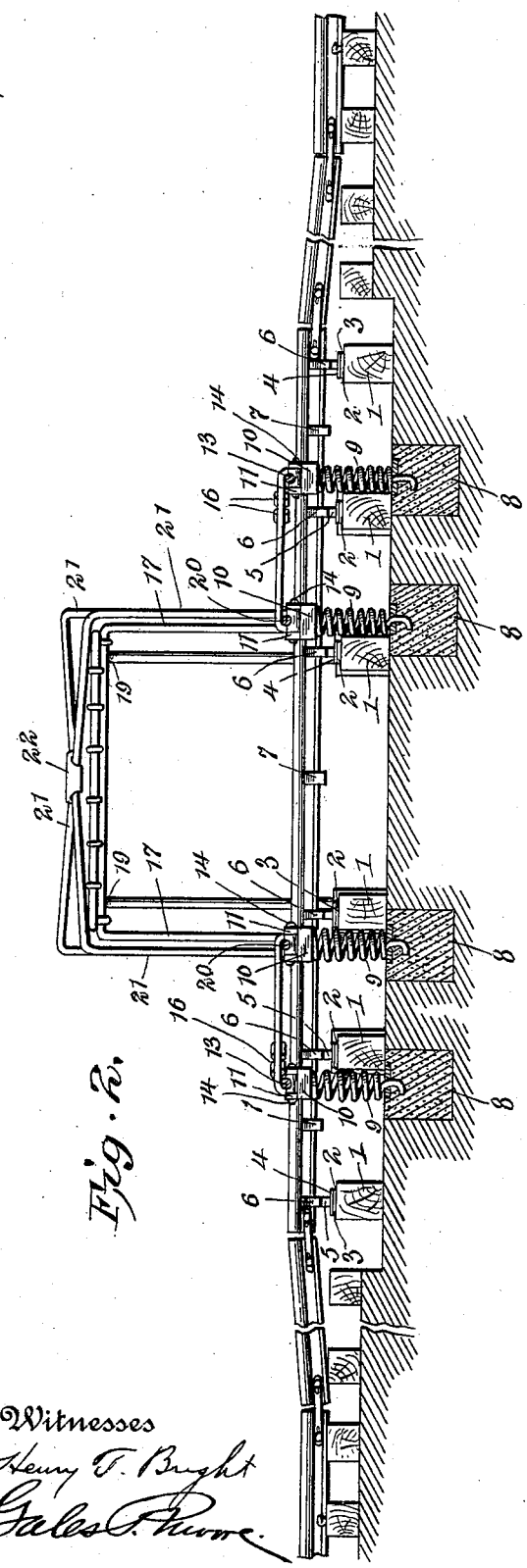
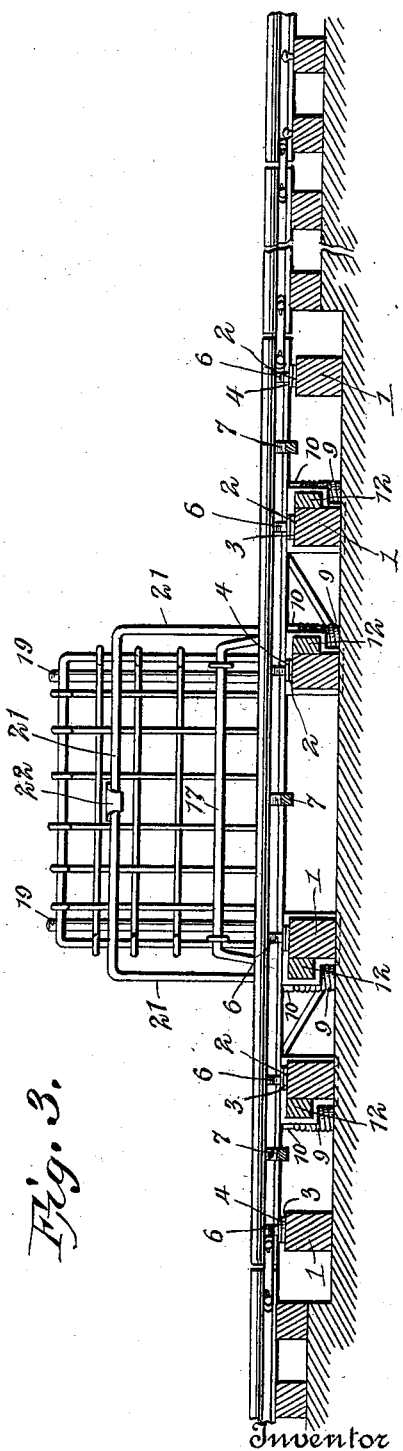
Witnesses
Henry T. Bright
Gales P. Pierce
Inventor
Thomas P. Theriault
by F. G. Appleman
Attorney

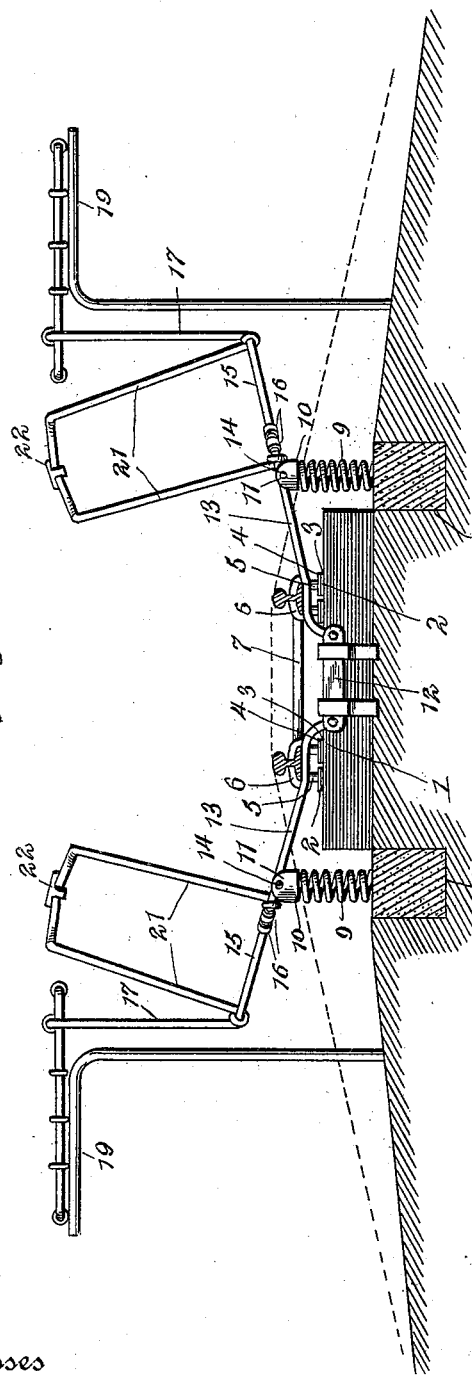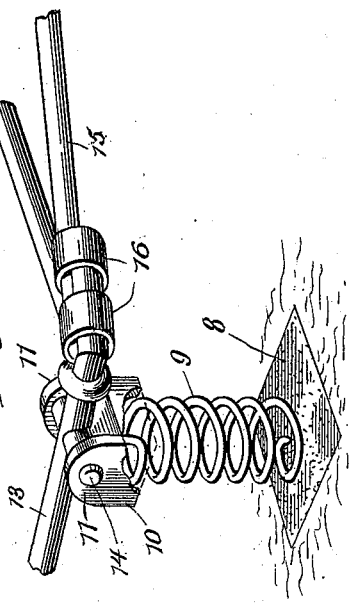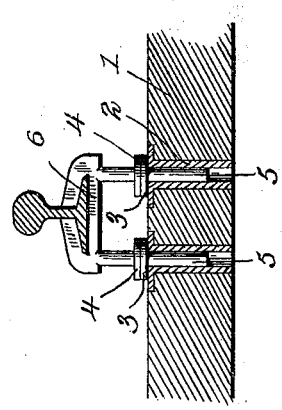

UNITED STATES PATENT OFFICE.

THOMAS P. THERIAULT, OF ST. FRANCIS, CANADA, ASSIGNOR OF ONE-HALF TO VINCENT M. THERIAULT, OF FORT KENT, MAINE.

AUTOMATIC GATE FOR STREETS CROSSING RAILWAYS.

SPECIFICATION forming part of Letters Patent No. 649,184, dated May 8, 1900.

Application filed August 28, 1899. Serial No. 728,760. (No model.)

*To all whom it may concern:*

Be it known that I, THOMAS P. THERIAULT, a subject of Her Majesty the Queen of Great Britain, residing at St. Francis, in the county of Madawaska and Province of New Brunswick, Canada, have invented certain new and useful Improvements in Automatic Gates for Streets Crossing Railways, of which the following is a specification, reference being had therein to the accompanying drawings.

This invention relates to railway-gates, and particularly to that class known as "vertically-movable" gates.

The object of the invention is to produce gates which are elevated through mechanism controlled by the weight of the cars, whereby a section of the track is depressed and levers are set in motion, causing a descent of the said gates, which are automatically returned to their elevated position through the agency of springs suitably anchored.

With the above and other objects in view the invention consists in the details of construction and in the arrangement and combination of parts to be hereinafter more fully set forth and claimed.

In describing the invention in detail reference will be had to the accompanying drawings, forming part of this specification, wherein in like characters denote corresponding parts in the several views, and in which—

Figure 1 is a plan view of a section of a track connected with gates embodying the invention. Fig. 2 is a sectional view taken on the line 2 2 of Fig. 1, showing the gate elevated. Fig. 3 is a longitudinal sectional view taken centrally of Fig. 1, showing the gate closed. Fig. 4 is a transverse sectional view taken on the line 4 4 of Fig. 1. Fig. 5 is a detail in perspective, showing the spring and its connections. Fig. 6 is a view in longitudinal section of one end of a cross-tie, showing the rail in section and a guide in elevation.

In the drawings, 1 indicates a series of cross-ties or sleepers apertured to receive sleeves 2, which have their upper ends spread and bent down on the sleepers to form seats for rubber cushions 3, which in turn support metallic collars 4. Two of the sleeves and the accompanying parts are required on each end of a sleeper, and slidably fitted in the sleeves are the legs 5 of a guide 6, which has its top shaped to embrace the base of an ordinary rail.

Stay-rods 7 are provided at predetermined points for holding the rails rigid and to prevent spreading. Each end of the stay-rods is provided with recesses in which the bases of the rails fit, as fully shown in Fig. 2.

At the side of the road-bed, suitably spaced, are foundations 8, in which the lower ends of the springs 9 are embedded and anchored, and the upper ends of the springs are provided with shoes 10, recessed at the top to produce ears 11.

Near each end of the movable section of the track I attach to the sleepers or cross-ties the beams 12, which are encircled by collars, whereby said beams are held in place. Levers 13 are pivoted to the ends of the beams and are attached to the shoes by pins 14, passing through the ears of the shoes and said levers. Each lever 13 has a joint or extension 15, which is set at an angle to the lever 13, and the lever and extension are secured together by metallic bands 16. The ends of the extensions 15, on each side of the railroad-track, are connected by a metallic arch 17, on which the gate is pivoted.

At each side of the railway are two supporting-posts stationed on opposite sides of the roadway, said posts having their upper ends 19 bent horizontally to form supports for the gate when in its elevated position, and they also act as guides for causing the gate to assume a vertical position as it descends.

Levers 20 are pivoted to beams 12', similar to those heretofore described, and they are secured on shoes supported by springs and are attached to the extensions 15 at the junction of the extensions and arches.

It will be understood that the length of the extension 15 will be varied to cause the gate to close when the train is near to or remote from the crossing and that the longer this extension the farther away the train will be.

Metallic braces 21 are arched over the driveway and bind the levers together for giving rigidity to the structure. They are crossed at the top and are bound together by a band 22. These braces are connected to the levers, as shown in Fig. 4.

In practice the springs exerting an upward pressure on the levers 13 will serve to elevate the rails of the track, and as the train passes to the elevated section its weight will depress the rails until they rest on the sleepers. As the descent of the rails will depress the levers, the arch at the ends of the levers will be carried down, and as said gates ride over the posts they will be guided and caused to assume a vertical position to obstruct the driveway over the tracks, and as the train passes from this section of the track the springs will elevate the levers and they will again support the track clear of the sleepers and at the same time the gate will be deposited on top of the posts.

Having fully described the invention, what I claim as new, and desire to secure by Letters Patent, is—

1. In a railway-gate, a section of a track held normally elevated, levers pivoted between and supporting the rails, springs supporting the levers, extensions on the ends of the levers, gates carried thereby, levers between the end levers connected to the extensions of the end levers, and posts for supporting and guiding the gate.

2. In a device of the character described, a track elevated above the cross-ties, guides for embracing the bases of the rails, sleeves in the cross-ties in which the legs of the guides are slidable, levers operated when the track is depressed, and gates controlled by the action of the levers.

3. In a railway-gate, a series of apertured sleepers, sleeves in the apertures, cushions on the sleeves, guides operating in the sleeves and having their tops shaped to embrace the bases of the rails, beams secured to the sleepers, levers pivoted to their ends, springs having shoes to which the levers are secured, extensions for the levers, arches secured to the extensions, gates carried thereby and posts for supporting and guiding the gates.

4. In a railway-gate, sleepers having apertures, sleeves in the apertures, a cushion for each sleeve, guides having legs operating in the sleeves, said guides having means of attachment with the bases of the rails, beams secured to the sleepers, levers pivoted to the beams, a track comprising rails resting on the levers, springs for holding the levers normally elevated whereby the track is suspended, extensions on the levers terminating in arches, gates pivoted to the arches, posts for supporting and guiding the gates and braces extending from lever to lever and arched over the driveway as and for the purpose described.

In testimony whereof I affix my signature in the presence of two witnesses.

THOMAS P. THERIAULT.

Witnesses:
HERBERT W. COFFIN,
A. G. FENLASON.